June 30, 1931.  F. E. PFEIFFER  1,812,605

AUTOGRAPHIC REGISTER

Filed July 24, 1929  12 Sheets-Sheet 3

FRANK E. PFEIFFER,

June 30, 1931.  F. E. PFEIFFER  1,812,605
AUTOGRAPHIC REGISTER
Filed July 24, 1929    12 Sheets-Sheet 11

FRANK E. PFEIFFER, Inventor

Attorneys

Patented June 30, 1931

1,812,605

UNITED STATES PATENT OFFICE

FRANK E. PFEIFFER, OF DAYTON, OHIO, ASSIGNOR TO THE EGRY REGISTER COMPANY, OF DAYTON, OHIO, A CORPORATION OF OHIO

AUTOGRAPHIC REGISTER

Application filed July 24, 1929. Serial No. 380,502.

My invention relates to autographic registers.

It is an object of this invention to provide an autographic register in which there is both a summary sheet and a detail entry sheet, or sheets.

It is a particular object of my invention to provide a different rate of movement, storage and ejection of the main record sheet containing the summary and detail entry sheets containing the details of the transactions recorded and constituting either a permanent record or a customer's receipt.

It is a further object of my invention to operate both types of entry sheets from a common actuating handle.

It is a further object to provide separate detachable compartments for containing in pack form the different types of sheets for summary and detail entries.

It is an object of my invention to provide means for aligning the detail entry sheets and for actuating those sheets while at the same time actuating the summary sheet.

It is a further object of my invention to provide an operating means consisting of a single continuous movement in which the detail entry slips are ejected and aligned, the aligning taking place after the ejecting has stopped; while at the same time the operating means is constantly moving at a slower rate than the single summary sheet, such detail sheets and summary sheet being superimposed so that a carbon copy of the entry on the detail sheets will be simultaneous on the summary sheet.

It is a further object to provide for the simultaneous entry direct upon the summary sheet of a classified autographic summary.

It is a further object to provide means for rendering the operation of the detail sheets inoperative during any given cycle of operation without rendering inoperative the movement of the summary sheet.

Referring to the drawings.

Referring to the drawings in detail, 1 is a cover having a writing opening 2 through which the detail entry strips are exposed, which are designated 3 and 4. 5 is a writing opening through which is exposed the summary sheet 6. 7 indicates the summary tabulation endorsed upon the face of the cover 1 adjacent the opening 5 in order to guide the entry of the summary charges. The register is provided with the usual side walls 8 and 9, a front wall 10 and a rear wall 11 to which the cover 1 is hinged. A bottom 12 completes the enclosure. 13 indicates the case for supporting on the shaft 14 the carbon roll 15. This roll is composed of superimposed sheets 17 and 18 which are carried across the spacer plate 19 and are fastened with the clamp 20 on the side of the machine. These carbon sheets have superimposed openings 21 which coincide with the opening 22 in the spacer plate 19. This opening 22 extends complete across the sheet so that the carbon entries in the summary portion of the detail strips will be entered upon the summary sheet simultaneously with the entry upon the detail strips, but by cutting away the carbons to leave the opening 21 entries can be made direct upon the summary sheet for summary purposes.

This spacer 19 is loosely mounted upon the writing table 23 and is aligned in position by a pair of studs 24 which project through openings in the rear edge of this spacer plate 19. The summary sheet 6 passes beneath the spacer 19 and on top of the writing table 23. The summary sheet is guided by the guide roll 27 carried by the recessed end 28 of the writing table 23. Having passed over the writing table it passes downwardly through the slot 29 at the forward end of the writing table and thence between its actuating rollers 30 and 31 which draw it over the writing table.

The detail entry sheets are so arranged that the sheet 4 passes over the top of the spacer 19 beneath the carbon strip 18, being guided in this connection by the guide roller 32 of the writing table designated 23. The sheet 3 passes over the top of the carbon strip 18 and beneath the carbon strip 17 and over the guide roller 26. Both of the sheets 3 and 4 have spaced file punch holes 33 which are used for aligning the sheets.

*Aligning mechanism*

The operating handle 34 operates the shaft 35 that is journaled on either wall of the register. This shaft carries a master driving gear 36 which drives a pinion 37 on the shaft 38. To the shaft 38 is fixed the gear 39 which engages with the lower ejecting roll gear 40 that in turn meshes with the upper ejecting roll gear 41. The lower ejecting roll shaft is designated 42 and the upper shaft 43. The lower shaft is cut away as at 44 to receive the pin 45 carried on the sleeve 46 which is loosely mounted on the upper shaft 43 and yieldingly pressed into position by the spring 47. The center portion of the shaft 43 is occupied by the ejection roller 48 which has the space knurled surfaces 49 on either end thereof. On the opposite side of this roller 48 is a second sleeve 50 having aligning pin 51. This sleeve is loosely mounted upon the shaft 43 and is yieldingly pressed by the spring 52 against the sleeve 46, such spring 52 resting against the abutment 53. The pin 51 depends through the slot 54 in the lower roller. The lower roller shaft 42 carries the spaced knurl members 55 and 56. It carries the spaced paper supporting rolls 57 and 58.

Depending from the sleeve 50 is an offset cam member 59. A similar offset cam member 60 is carried by the sleeve 46. These respective cam members are adapted to be engaged by the stops 61 and 62. Stop 62 is formed on the end of the hook lever 63 of which there are a pair on either side of the machine between which is carried a plate 64 on which is mounted the stop 61.

These cam members 59 and 60 ride upon oppositely disposed portions of the shaft 42 and serve to elevate the shaft 43 so as to separate the knurled surfaces 49 from a point adjacent the knurled surfaces 55 and 56 to stop the ejection of the paper. The ends of the shaft 43 are carried on the sliding plates 65 which are yieldingly resisted in the upward movement by the spring 66 and which engages the upper side of the stop 67 on the side wall of the register. The spring is carried on a pin 68 which depends from the slide 65. The tension of the spring is adjusted by nut 69 on the pin 68. The sliding plate 65 is slotted as at 70 for the reception of the cam shaft 71, the rotation of which from the outside of the machine by the knurl button 72 will manually spread the rolls at any time desired.

Figures 15, 16, 17, 18:
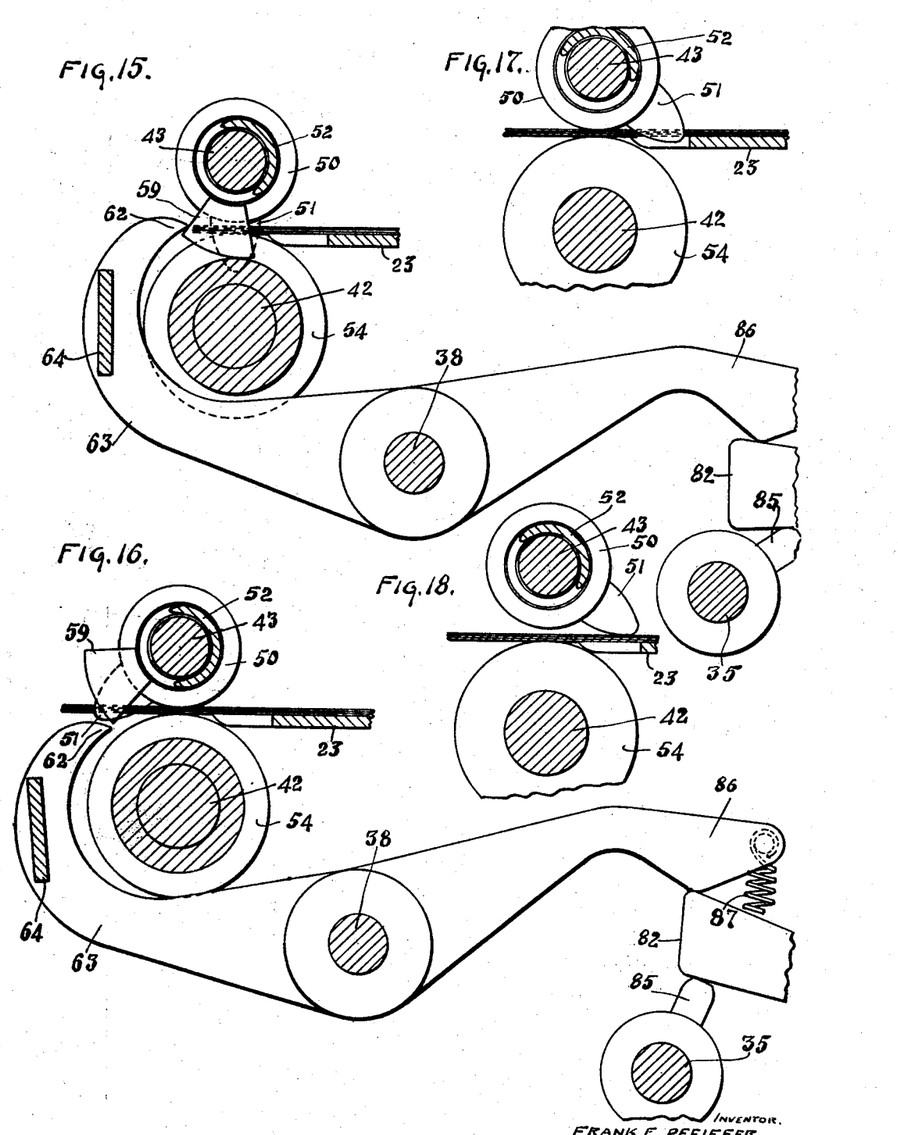
Fig. 15 is a section on the line 15—15 of Fig. 1 showing diagrammatically the position of the aligning pins and locking mechanism when the sheets are in aligned position.
Fig. 16 is a similar view showing the sheets in unlocked position at the beginning of the ejection operation.
Fig. 17 is a similar view showing the sheets at the beginning of the aligning operation and at the cessation of the ejection operation.
Fig. 18 is a similar view showing the position of the aligning pins, during the latter part of the ejecting operation, in position to drop into the aligning holes.

In operation, the aligning pins move from the position shown in Fig. 15 out of the holes 33 in the paper as in Fig. 16 and simultaneously the cams 59 and 60 pass out from between the roll and permit the knurled surface to engage the paper and eject it. This continues while the pins are resting upon the surface of the paper, as in Fig. 18 until the holes 33 in the paper come beneath the pins, as in Fig. 17, whereupon the alignment of the paper begins at which time the cams 59 and 60 serve to spread the rolls apart while the stop members 61 and 62 engage these cam members and prevent them from further rotation bringing the paper in aligned condition with the pins in a vertical position.

Mechanism for rendering ejecting means inoperative

Figure 1:
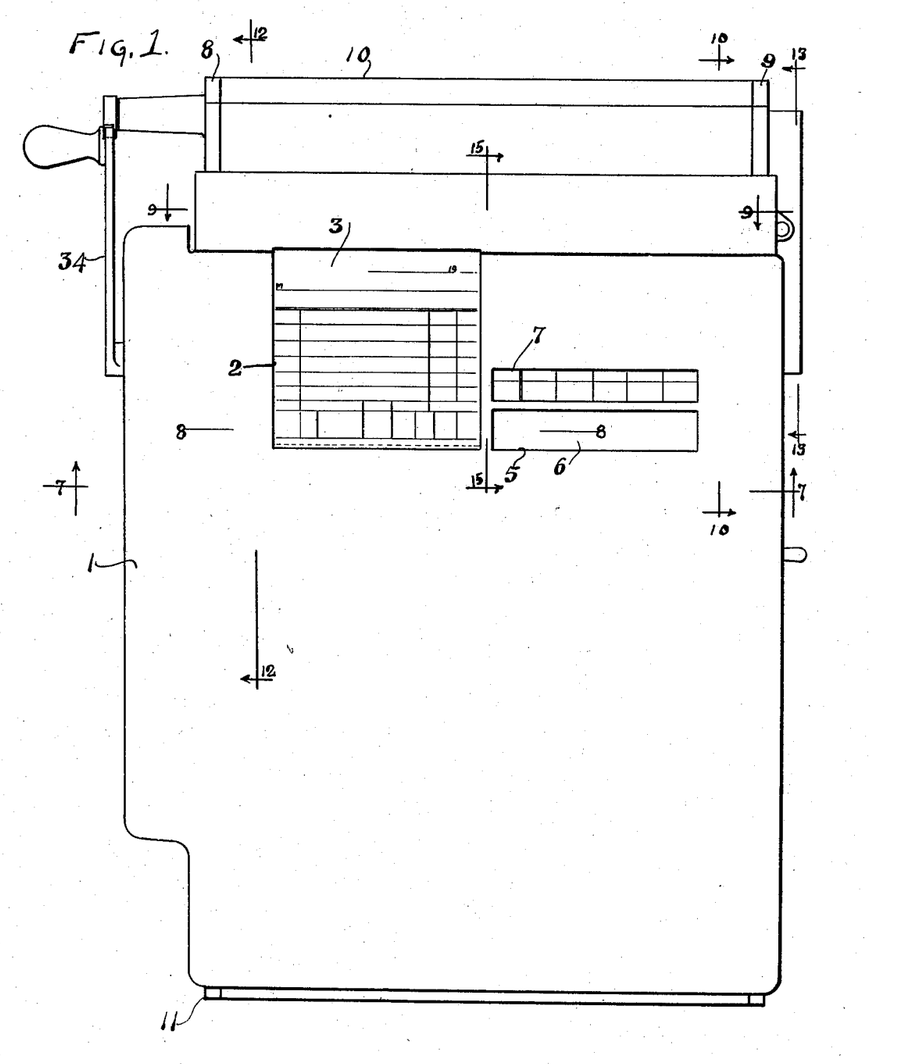
Fig. 1 is a top plan view with the cover in position showing the openings for the entries on the detail sheets and on the summary sheet.
Figure 2:
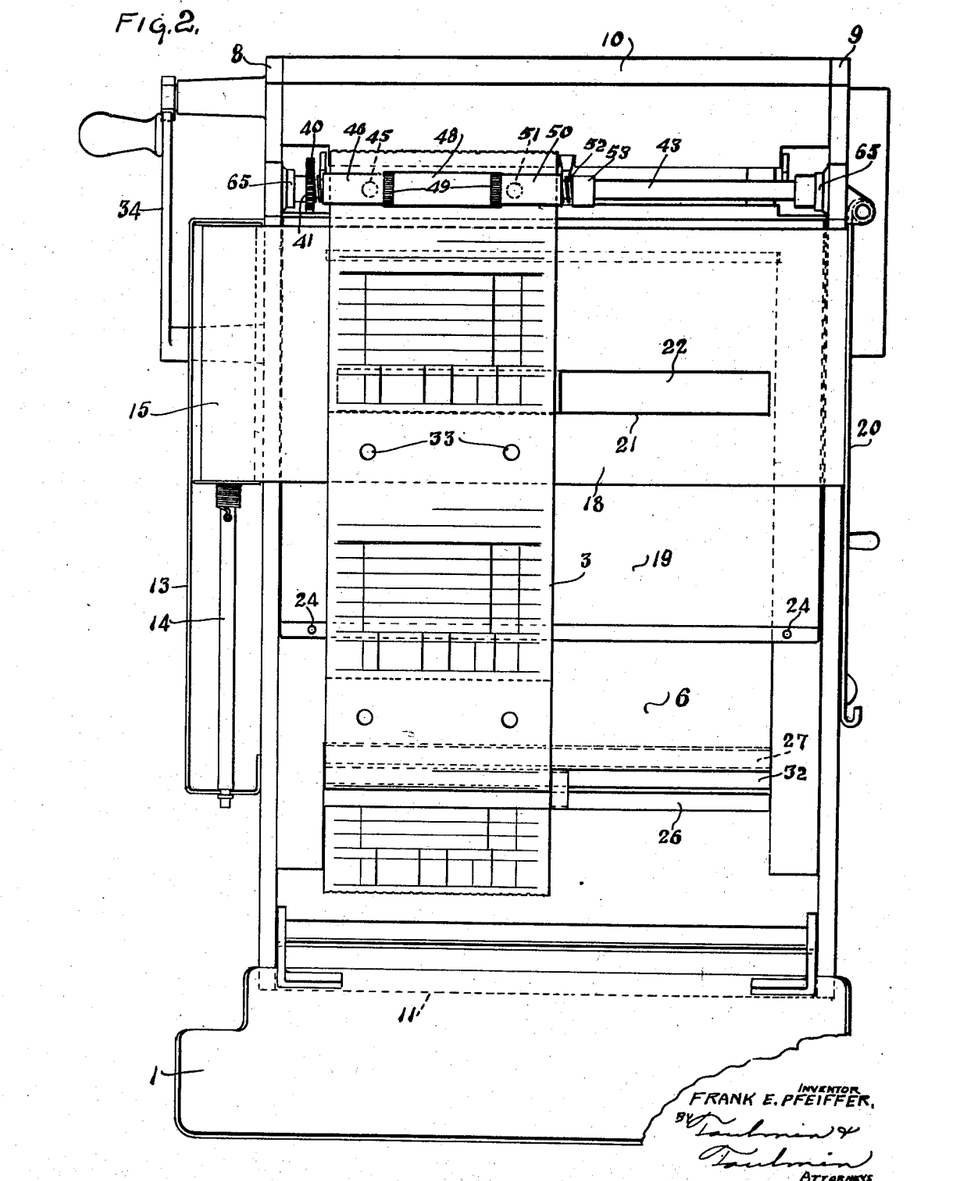
Fig. 2 is a similar view with the cover raised.
Figure 3:
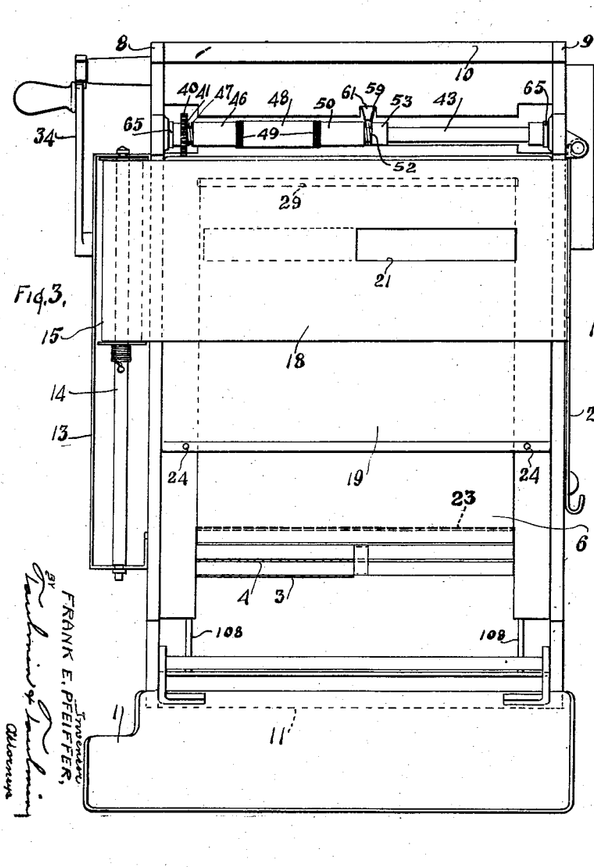
Fig. 3 is a view with the detail sheets removed, but with the summary sheet and carbons in position together with the spacer.
Figure 4:
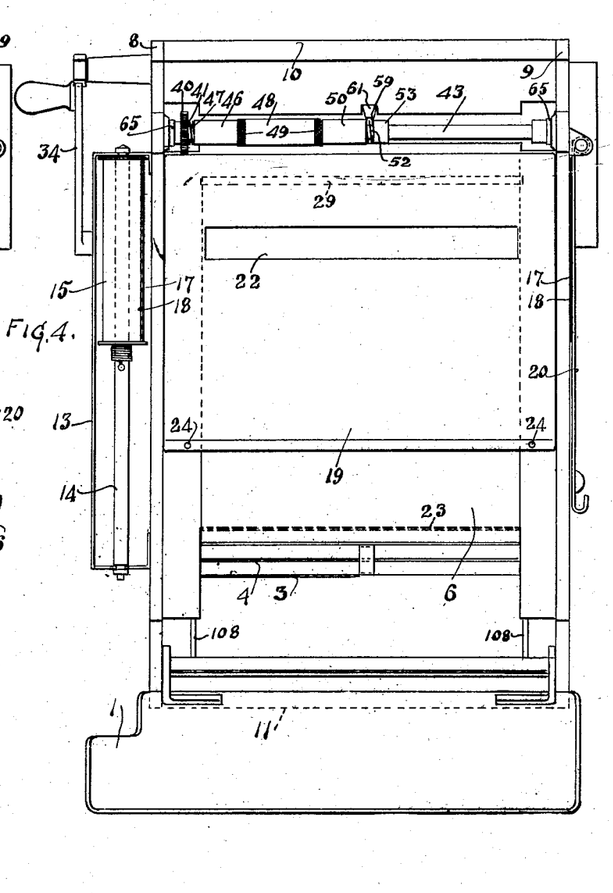
Fig. 4 is a similar view with the carbons removed.
Figure 5:
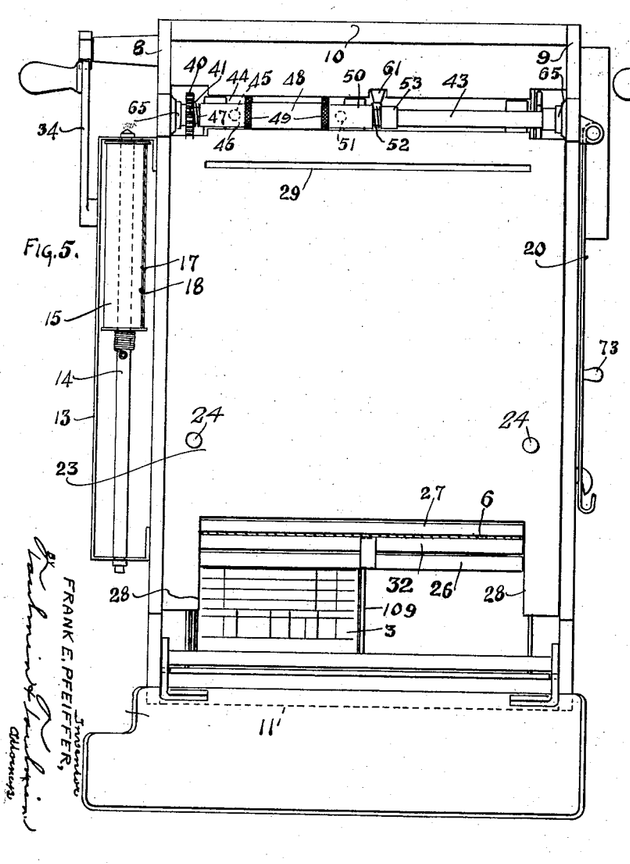
Fig. 5 is a similar view with the summary sheet and spacer removed showing the top of the writing table.
Figure 6:
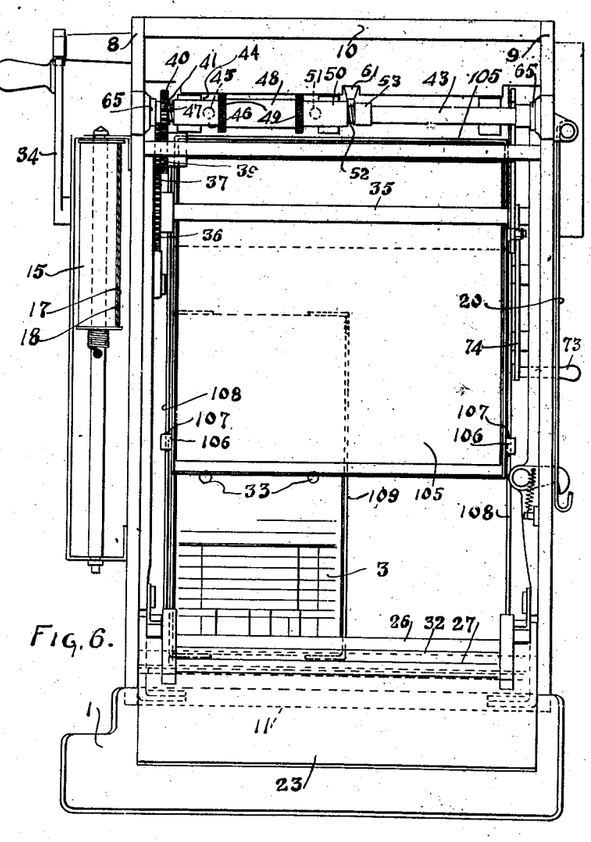
Fig. 6 is a similar view with the writing table elevated to show the arrangement of the superimposed storage boxes for the summary sheets and detail sheets.
Figure 7:
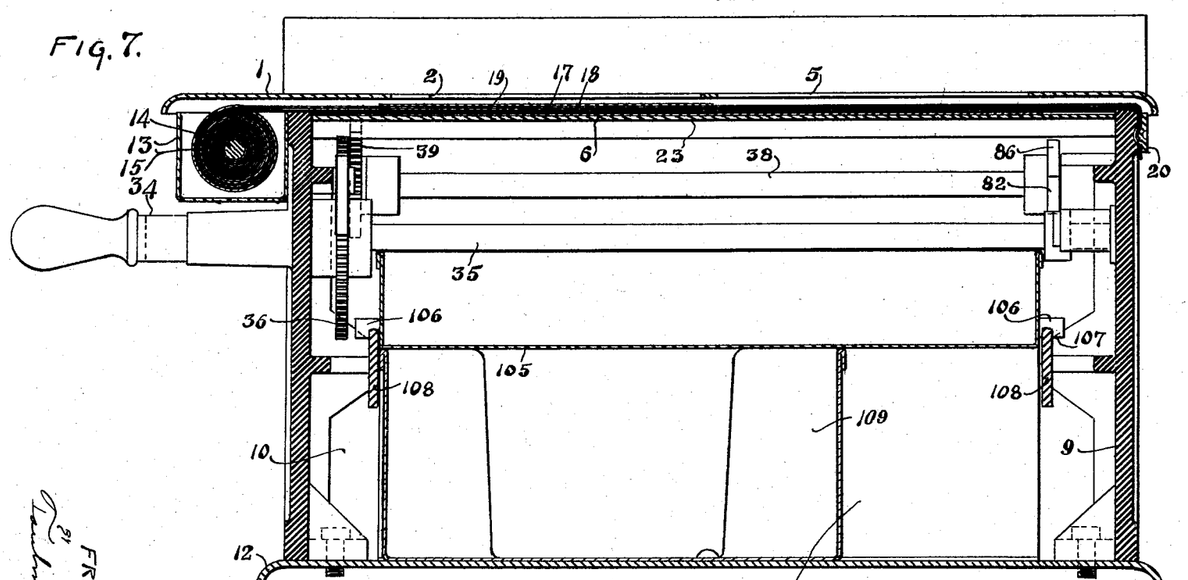
Fig. 7 is a section on the line 7—7 of Fig. 1.
Figure 8:
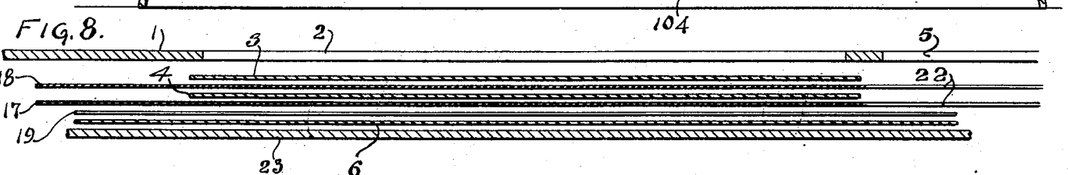
Fig. 8 is a detail in enlarged section with the sheets shown in separated condition to show their superimposed arrangement on the line 8—8 of Fig. 1.
Figure 9:
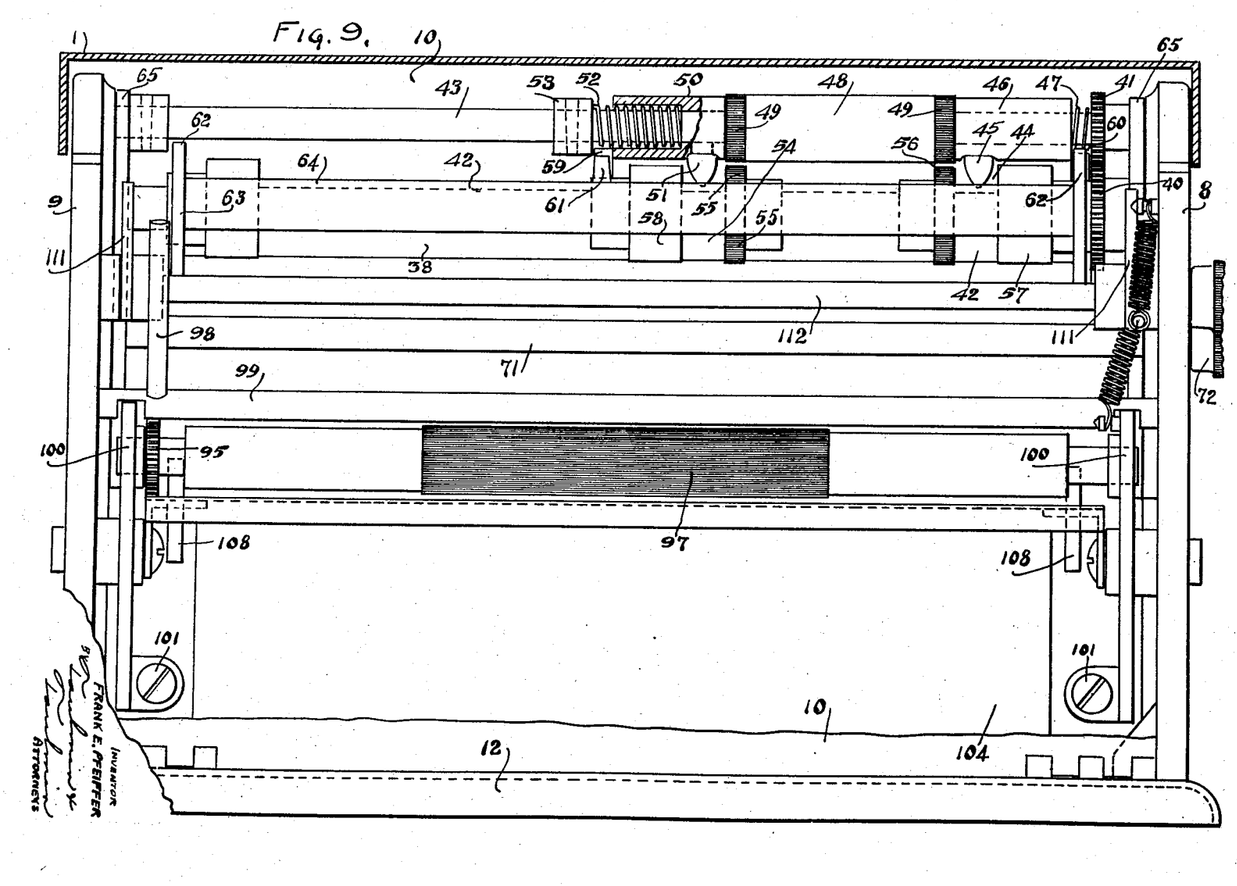
Fig. 9 is a section on the line 9—9 of Fig. 1, showing in elevation, partly in section, the arrangement of the ejecting and aligning mechanism.
Figure 10:
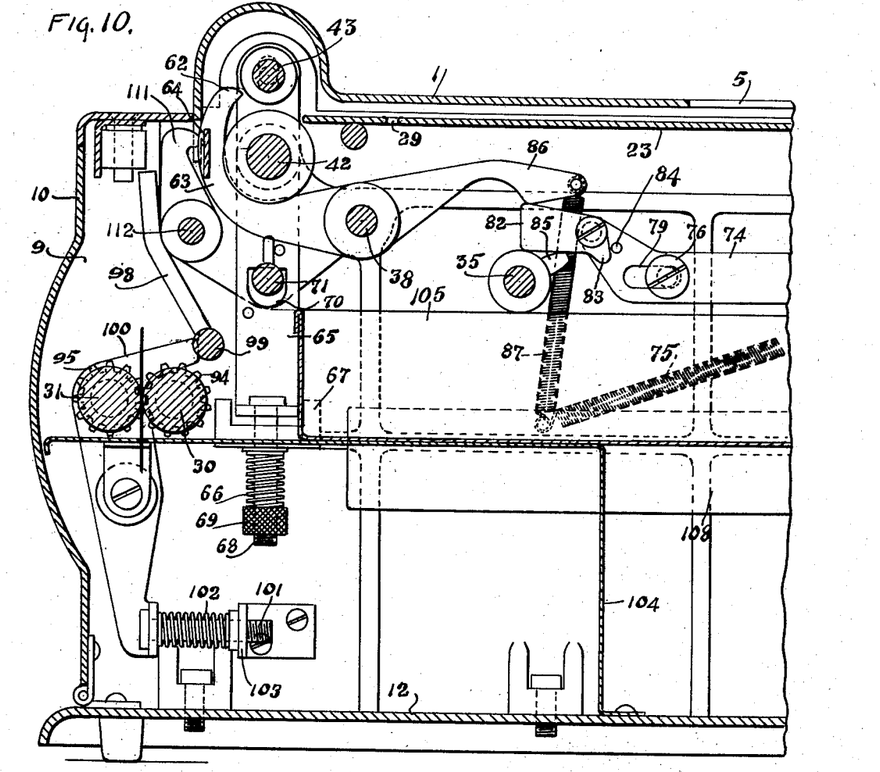
Fig. 10 is a section on the line 10—10 of Fig. 1.
Figure 11:
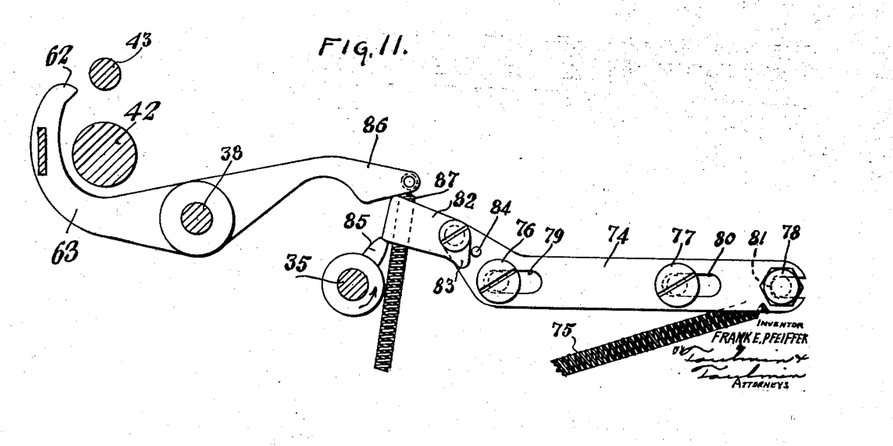
Fig. 11 is a skeleton view of the mechanism for locking the detail strip of the ejection mechanism out of operation, such mechanism being in locked position.
Figure 12:
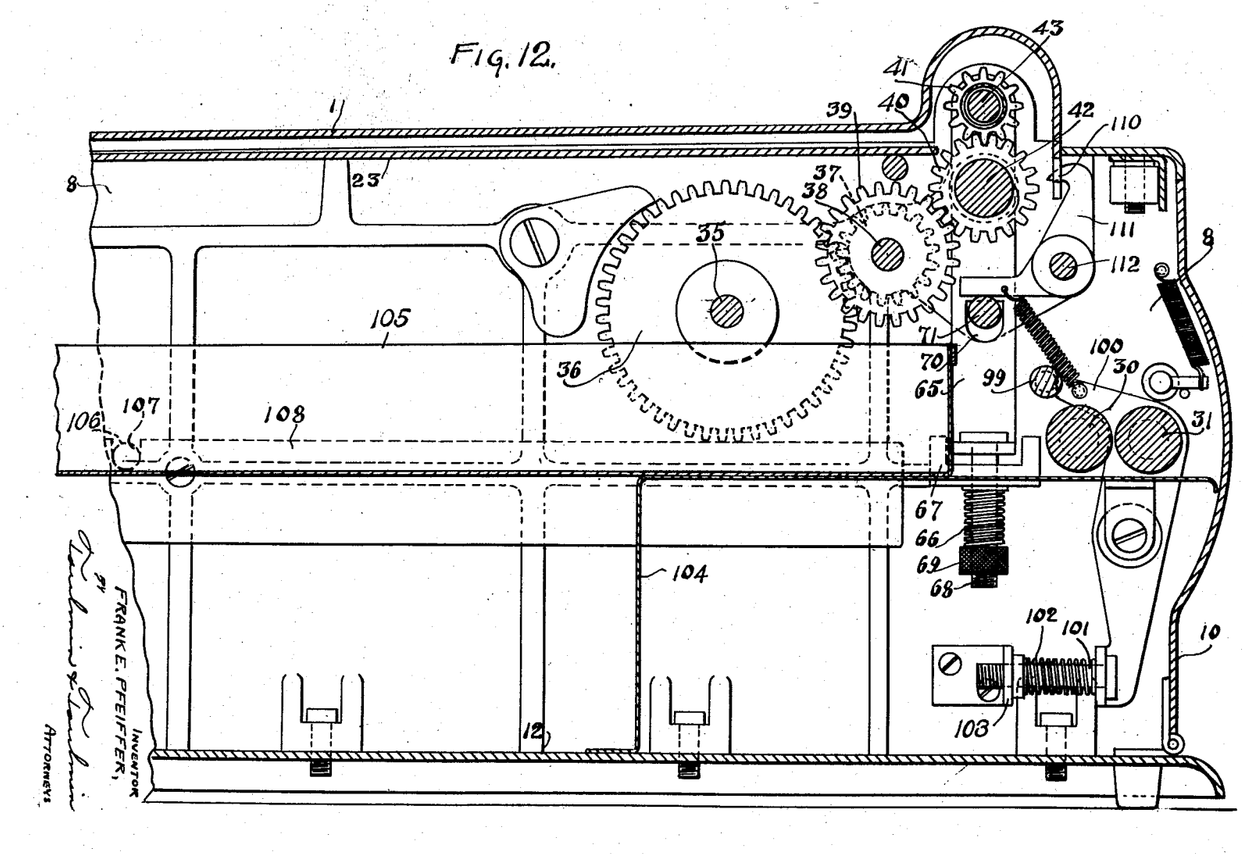
Fig. 12 is a section on the line 12—12 of Fig. 1 showing the driving gearing.
Figure 13:
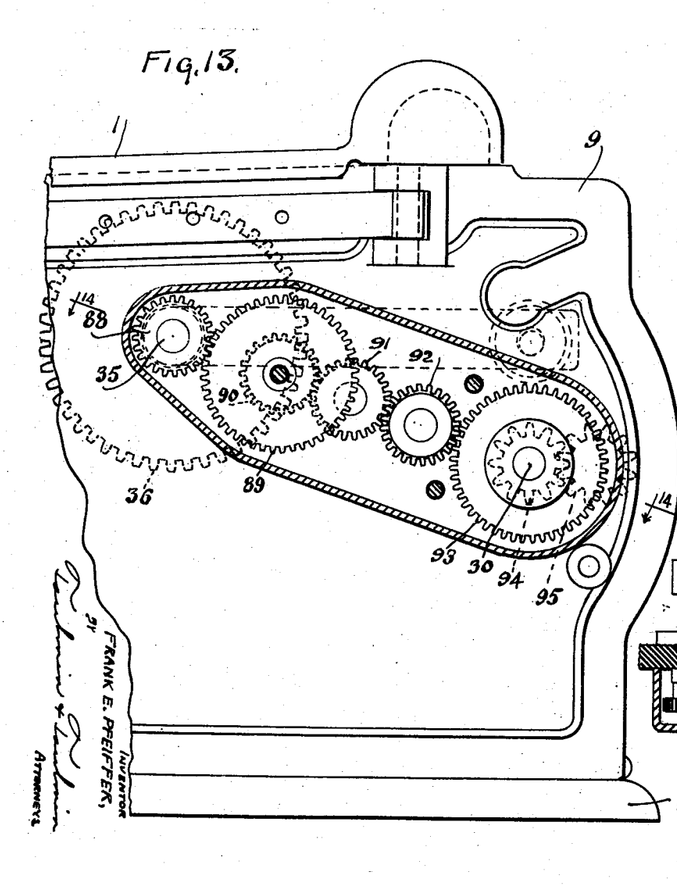
Fig. 13 is a section on the line 13—13 of Fig. 1 showing the driving gearing for the summary sheet.
Figure 14:
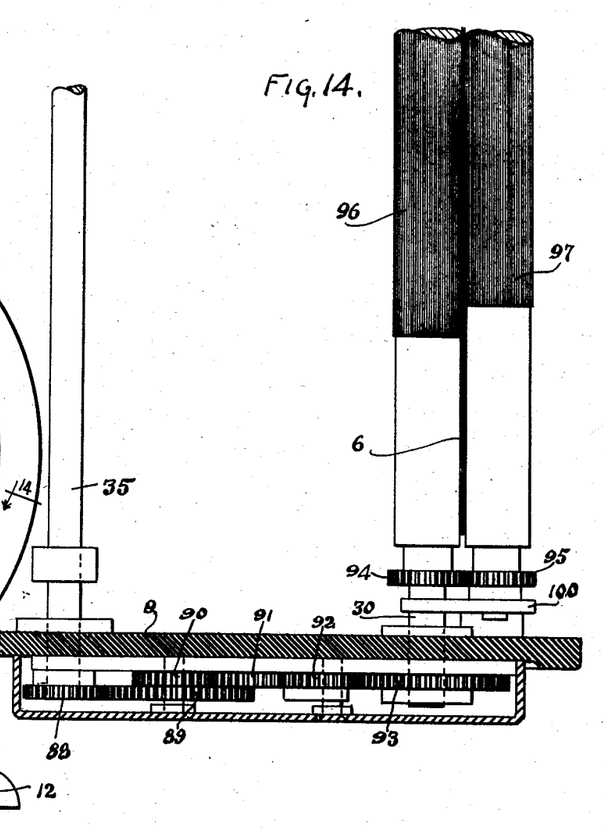
Fig. 14 is a section on the line 14—14 of Fig. 13.

By moving the finger pin 73 which extends outside of the register, the plate 74 can be moved backwardly against the tension of the spring 75 as it is guided upon the studs 76, 77 and 78 working in the slots 79, 80 and 81. The stud 78 is on the end of plate 74 and works in the slot 81 in the side wall 8. This draws the pivoted cam nose 82 backwardly with the plate 74, the depending end 83 of such nose resting against the stop pin 84 on the plate 74. This cam nose 82 is normally elevated by the pin 85 on the main driving shaft 35 which turns in a counterclockwise direction as shown in Fig. 11. When this happens the member 82 lifts the inner end of the lever 63 designated 86 to which is connected the spring 87 that resists its upward movement. If the cam nose 82 is withdrawn prior to this movement by the backward movement of the piece 73 and plate 74 then, as the shaft 35 rotates under the influence of the handle 34 the cam 82 will drop down behind the pin 85. In such an event the pin 85 passes by the nose 82 without engaging and elevating it so that the end 86 of the arm 63 is not actuated and the stops are not removed from in front of the spreading cams 59 and 60 with the consequence that the rolls remain in spread condition and the detail record strips are not moved although the movement of the handle continues to move the summary sheet through actuating the rolls 30 and 31 as will be hereinafter explained.

Summary sheet actuating means

The summary sheet actuating means consists of the shaft 35 on which is the gear 88 which meshes with the gear 89, and actuates pinion 90, gear 91, gear 92, gear 93 on the shaft 30 which gear 94 actuates the gear 95 on the shaft 31. These shafts are knurled as as 96 and 97 for actuating the record summary strip of paper designated 6.

Due to this reduction gearing just mentioned the summary sheet moves a sufficient distance at each cycle of the operations to disclose a fresh surface the width of the opening 5.

This pair of rolls 30 and 31 can be separated when desired by actuating the handle 98 which rotates the cam shaft 99, which engages with the nose of the bell crank side plates 100 that carry the roll 31. The lower end of this bell crank plate 100 carries the pin 101 on which is a spring 102 that engages the stop 103 to yieldingly resist the spreading of the rolls 30 and 31. The receiving box for the strips 6 is designated 104. This box serves to support the forward end of the record strip supply tray 105 which has side pins 106 fitting in notches 107 in the side plates 108 carried on the side walls of the register. Beneath the rear end of this removable tray for the record sheets is a permanently attached box for the detail strips, such box being designated 109.

Figures 19, 20:
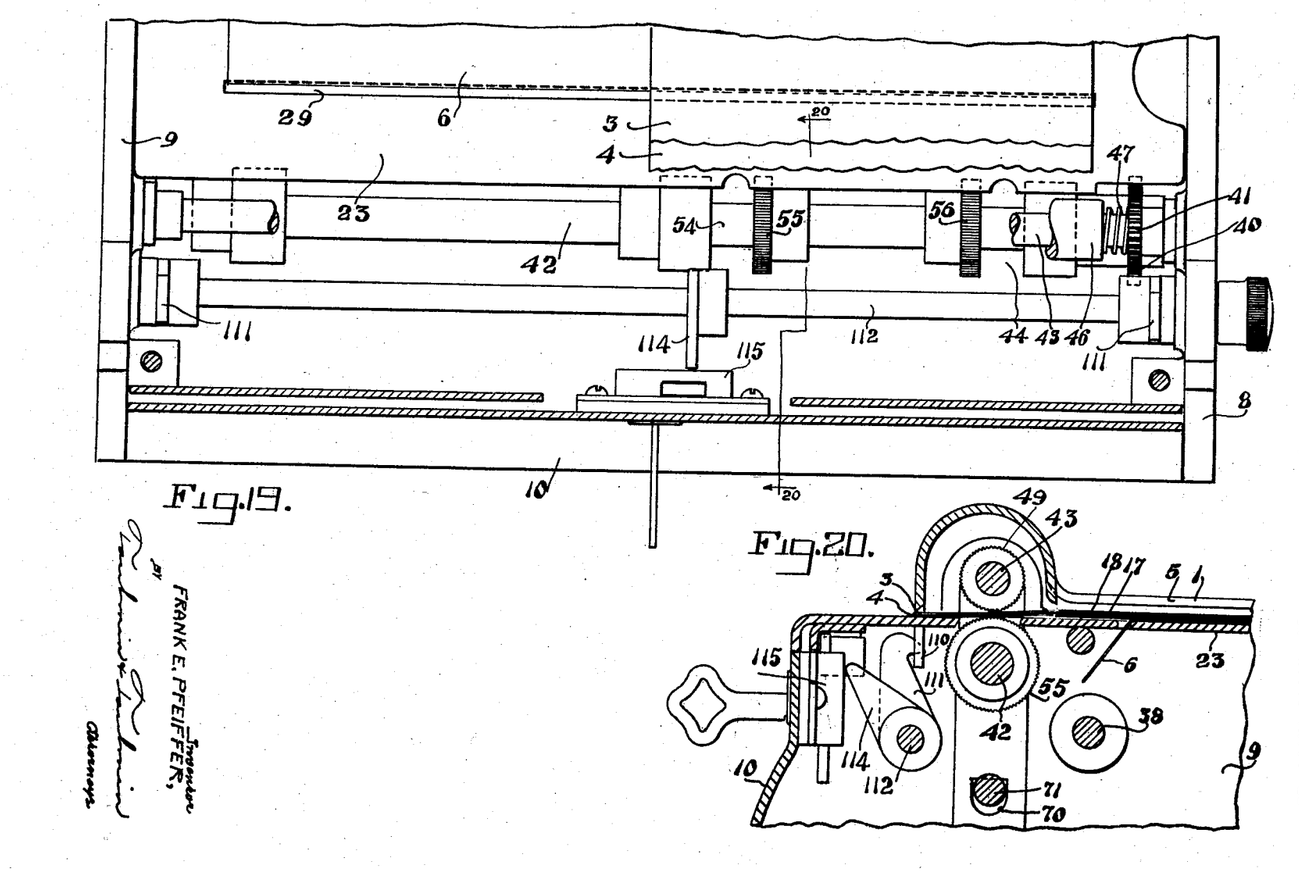
Fig. 19 is a detail sectional view of the front door locking mechanism to prevent lifting of the cover.
Fig. 20 is a section of the line 20—20 thereof.
Figure 21:
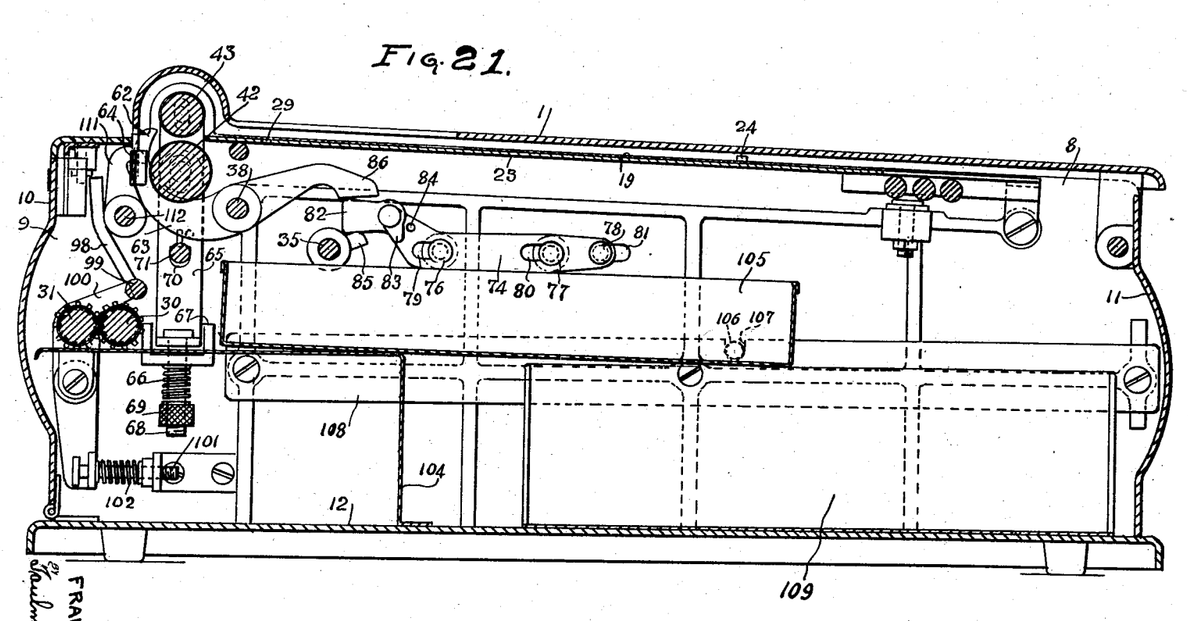
Fig. 21 is a longitudinal vertical section through the center of the autographic register.

In Figures 19 and 20 there is shown the method of locking the cover 1 when the front wall of the register is closed. The cover 1 is provided with depending eyes 110 which are engaged by hooks 111 that may be rotated out of locking position by the shaft 112 which is actuated by the knurl head 113 on the exterior of the casing. This shaft 112 carries a finger 114 which rests against the lock 115 of the front wall 10. It is therefore necessary to open the front wall 10 so that the rotation of the shaft 112 can take place and thereby unlock the cover 1, as otherwise the finger 114 will rest against the lock 115 of the end wall 10 and the shaft can not rotate.

It will be understood that I desire to comprehend within my invention and within the scope of my claims such modifications as may be fairly comprehended within such claims and invention due to necessary modifications to adapt my invention to varying conditions of use and to varying purposes.

I claim:

1. In an autographic register, a pair of spaced, separated, knurled ejecting rolls, a pair of spaced yieldingly positioned spring-operated aligning pins associated with one of said pair of the said knurled rolls and adapted to turn freely with respect thereto, cams associated with said pins for engaging portions of the other said rollers to spread said rollers one from the other, means to cause said rollers to turn together and an operating means therefor comprising a longitudinally movable plate.

2. In an autographic register, a pair of spaced, separated, knurled ejecting rolls, a pair of spaced yieldingly positioned aligning pins associated with a pair of said knurled rolls and adapted to turn freely with respect thereto, cam associated with said pins for engaging portions of the other of said rollers to spread said roller one from the other, means to cause said rollers to turn together, an operating means therefor, yielding means for yieldingly resisting the relative rotation between said pins and associated knurled rollers, movable stop members arranged in the path of said cam members to maintain them in spreading position, an operating handle for said rolls, cam means associated therewith for rendering said cam stopping means inoperative at a predetermined point in the cycle of operation and an independent manually operated means for rendering said stopping means inoperative for a complete cycle of operation.

3. In an autographic register, in combination with a pair of rollers having spacing cams connected therewith, a cam stop means comprising a transverse bar, pivotally mounted rocker arms carrying said bar, stop members associated with the arms and bar, an actuating shaft having a lifting pin thereon, a pivoted cam member lifted by said lifting pin and engaging one end of said arms and a spring for yieldingly resisting said lifting pin.

4. In an autographic register, in combination with a pair of rollers having spacing cams connected therewith, a cam stop means comprising a transverse bar pivotally mounted rocker arms carrying said bar, stop members associated with the arms and bar, an actuating shaft having a lifting pin thereon, a pivoted cam member lifted by said lifting pin and engaging one end of said arms, a spring for yieldingly resisting said lifting pin, a reciprocating support for said pivoted cam, stop means for limiting the pivotal movement of said pivoted cam on reciprocating support, yielding means for maintaining said support in normal position, manual means for moving it through abnormal position whereby, if the lifting cam is maintained by the reciprocating support in normal position so that it is lifted by said lifting pin, said stop will remain in operative position continuously through a cycle of operations.

5. In an autographic register, ejecting means, aligning means, common operating means therefor, roll-spreading means, stop means for holding said roll-spreading means in operative position, means comprising a longitudinally movable plate for intermittently moving said stop means out of spread position of said ejecting means.

6. In an autographic register, ejecting means, aligning means, common operating means therefor, spreading means for the ejecting means, stop means for holding said spreading means in operative position, means for intermittently moving said stop means out of spread position of said ejecting means and separately operated manual means for rendering the means moving the stop means inoperative for a complete cycle of operations.

7. In an autographic register, in combination with the cover, a writing table and a detachable spacer plate mounted thereon having a writing aperture therein arranged transversely of the writing table.

8. In an autographic register, in combination with a cover, a writing table having a transversely slotted forward end, a detachable separator plate position thereon having a transverse writing aperture therein.

9. In an autographic register having a register enclosure, a hinged end wall, a hinged cover, means in said register maintaining said cover in locked position and means on said locking means engaging the front wall of the register to maintain said locking means in locked position until the front wall is opened.

10. In an autographic register, a register enclosure having a removable front wall, a cover, means within said enclosure to lock said enclosure in position and means for maintaining said locking means in locked condition when said front wall is in closed position and means for operating said locking means to unlock it from a point outside of the register enclosure when the front wall is removed.

11. In an autographic register having a writing table with the stud on each edge, a spacer plate having an opening supported on said table and engaging said studs, means for feeding a broad summary sheet between the table and spacer plate, and means for feeding a narrow detail sheet over said table and spacer plate.

12. In an autographic register, means to feed a broad summary sheet, a writing table across which said sheet passes, means for feeding a narrow detail sheet, and a spacer plate extending across the table and the broad summary sheet and serving as a support for the detail sheet, said spacer plate having a slot therein for entries on the summary sheet to one side of the detail sheet.

In testimony whereof, I affix my signature.

FRANK E. PFEIFFER.